Nov. 18, 1952 — A. BERND — 2,618,732
ELECTRIC FLOW HEATER
Filed May 19, 1951
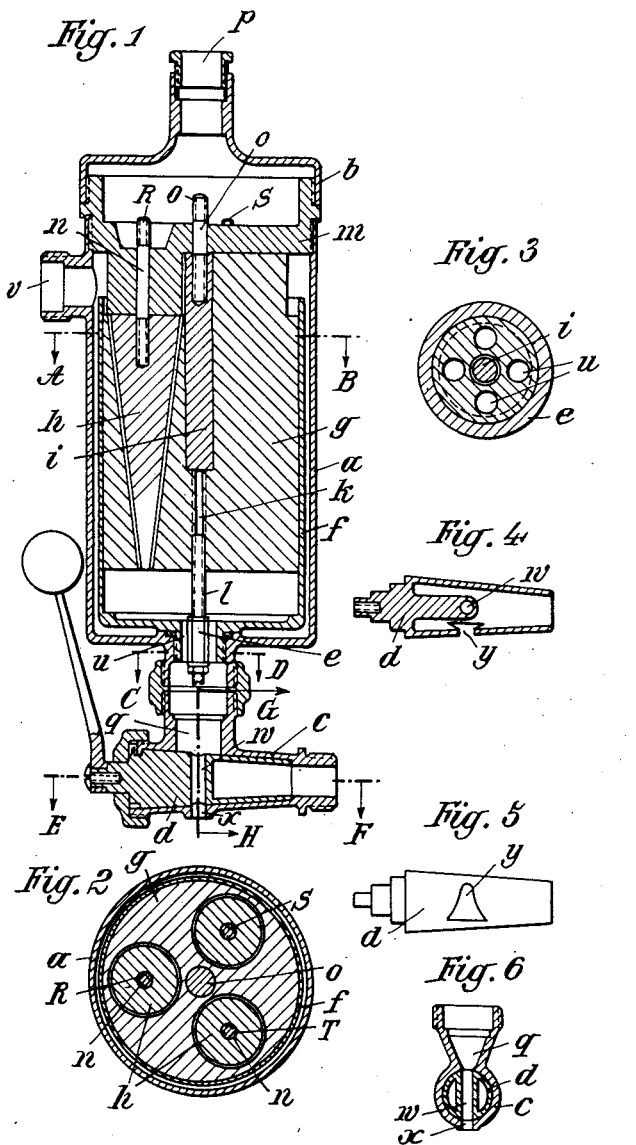

Patented Nov. 18, 1952

2,618,732

UNITED STATES PATENT OFFICE 2,618,732

ELECTRIC FLOW HEATER

Alfred Bernd, Herdecke, Germany

Application May 19, 1951, Serial No. 227,185
In Germany May 27, 1950

8 Claims. (Cl. 219—40)

This invention concerns a flow heater from which hot water may be drawn.

Electrode flow heaters are already known which all have metal electrodes, between which passes cold water taken directly from the water mains, said water, in its capacity of electrolyte, closing the electrical circuit between the electrodes and becoming heated due to electrolysis. It is known that chemically pure water (aqua destillata) acts as a very good electrical insulator, and that the electrolysis of natural water is made possible substantially by the inorganic and organic substances dissolved therein. During the electrolytic decomposition, these substances cause a more or less rapid destruction of the known metal electrodes, which, in known flow heaters, have to be changed at intervals depending upon the water conditions, in order to keep the heaters serviceable. The expense of maintaining these flow heaters is consequently extraordinarily high, and the necessary changing very inconvenient for the user, quite apart from the fact that the electric supply to flow heaters of this type constantly varies due to the increasing degree of destruction of the electrodes. The water is also rendered unsuitable for use as drinking water.

These difficulties can be avoided by the employment, which has not hitherto been known, of electrically insulated, built-in carbon electrodes.

It is thus possible to produce flow heaters which, if the conditions of natural water were everywhere the same, could be called serviceable in the sense that frequent electrode replacements are no longer necessary; at all events, such heaters do not display the faults previously set forth.

However, there arise still further difficulties than those mentioned above, even with heaters employing carbon electrodes, since the waters of different localities have different mineral contents, and hence a given volume of water from one locality will present a different resistance than the same volume of a water originating in a different locality. It thus becomes necessary to provide means for altering the spacing of electrodes.

According to the present invention an electric flow heater for heating water is provided with a plurality of electrodes disposed within and insulated from an outer casing provided therefor, there being means for admitting water into said casing so as to cause said water to flow between said electrodes and to be heated, due to electrolytic action, on passage of an electric current between said electrodes, and means for varying the spacing between said electrodes in order in part to vary the resistance presented by the water flowing therebetween.

A preferred embodiment of the invention is characterised in that the electrodes are constructed in the shape of a cone or a pyramid or otherwise tapering so that they fit into each other, and the spacing between them can be varied by axial displacement relative to each other.

More particularly there is provided an outer casing which may be directly connected to a main water supply, entry of water into the spaces between the electrodes being controlled by a cut-off valve adapted to interrupt the water supply before entry into the casing. A preferably cylindrical sleeve, for example a sleeve of pressed insulating material is inserted in the casing and surrounds a corresponding cylindrical electrode body having conical recesses and a recess for an electrode connecting member found therein, which body is displaceably disposed in the insert sleeve and is axially displaceable relative to the insert sleeve by adjusting a setting screw carried in the casing and engaging in a thread in the electrode body. An electrode holder, for example of pressed insulating material, carries depending conical counter-electrodes and an electrode connecting member, which are inserted so as to be insulated from each other and to be watertight, and which are connected with contact bushes for the connection of the necessary electrical cables or leads. This holder is let into the casing in a watertight manner, and a cover provided with a cable duct seals the entire casing in a watertight manner.

A heater constructed in this manner for obtaining hot water according to the principle of an electrode flow heater can be adapted in situ to the water conditions of any locality, and the use of carbon electrodes here ensures a long useful life of the heater.

The preferred form of construction of an electrode flow heater also of necessity demands a special form of construction of the cut-off valve, which is characterised by the fact that it is constructed as a plug valve and as such, when entry of water into the heater is interrupted, provides an access to the setting screw, which access serves at the same time as an outlet for any water still present in the insert sleeve between the electrodes. The valve housing is provided with an oblong passage, and to permit efficient regulation of the water inflow on opening of said valve, the plug may have a bore of generally triangular cross-section, which, on rotation of the plug, registers with the passage in the housing so as firstly to release only a small opening for water, and subsequently on the further rotation of the plug, to increase this opening.

The invention will be described further, by way of example with reference to the accompanying drawings, in which:

Fig. 1 shows a complete arrangement of an electrode flow heater in three phase star connection in longitudinal middle section, Fig. 2 is a cross-section through the heater, taken on the line A—B of Fig. 1, Fig. 3 is a section on the line C—D of Fig. 1, Fig. 4 is a section through the plug from the arrangement in Fig. 1 on the line E—F in Fig. 1, Fig. 5 shows a plug in full elevation in the position according to Fig. 1 and Fig. 6 is a section on the line G—H of Fig. 1.

As shown in Fig. 1, an electrode flow heater consists externally of a casing $a$, a cover $b$, a plug valve, comprising a housing $c$ and plug $d$, and appropriate connection means to water and electricity supply sources. In the casing $a$, an insert sleeve $f$ preferably consisting of pressed insulating material, is screwed into a threaded joining piece $e$. In this sleeve $f$ there is disposed an electrode body $g$ having three conical recesses adapted to receive a three phase counterelectrode arrangement $h$ (Fig. 2). A cylindrical bore serving for the reception of an electrode connecting member $i$ is provided in the center of the electrode body $g$. The electrode body $g$ is arranged to be axially displaceable in the insert sleeve $f$, and is provided with a centrally disposed threaded member $k$ having connected therewith a setting screw $l$, which setting screw is mounted in the foot of the insert sleeve $f$. By turning the setting screw $l$ the electrode body $g$ can be axially displaced upwards or downwards in the insert sleeve $f$. In the position shown, the topmost position of the electrode body $g$ has been reached. An electrode holder $m$ of pressed insulating material is let into the top of casing $a$ in a watertight manner. This electrode holder $m$ carries conically tapering counter-electrodes $h$ on contact bushes $n$. Each element of the counter-electrode arrangement $h$ is associated at any time with one phase in the star connection of the electrode flow heater, said elements being referred to as R, S and T. A contact bush $o$ is also let into the center of the electrode holder $m$ and carries the electrode connecting member $i$, whereby the connection of the neutral conductor from the star connection with the electrode body $g$ is effected. The contact bushes $n$ and $o$ pass through the electrode holder $m$ to the water-free side thereof, and are connected to a suitable cable (not shown), which is carried through the sealing cover $b$ of the casing, said cover being screwed on the electrode holder, and through cable duct $p$ to a connection to the electricity supply. The inflow of water to the heater takes place by way of plug housing $c$, which is connected to the water supply, through the plug $d$ and in the opened position thereof, through a passage $q$ in the plug casing, through openings $u$ in the threaded connection piece of the insert sleeve $f$ (Fig. 3), and into the electrode chamber, where it flows through the electrode body $g$ and the counter-electrodes $h$ and after having been heated, emerges from the outlet $v$ above the insert sleeve $f$. In Fig. 1, the plug is shown in the closed position. In the plug there is provided a member $w$ (Figs. 4 and 6) which in the position shown in Fig. 6 opens a passage to the setting screw $l$ by way of opening $x$ in the plug housing thus making possible the adjustment with a screwdriver of the position of electrode body $g$ relative to the counter-electrode arrangement $h$ in the insert sleeve $f$. At the same time, however, the member $w$ allows outflow of any water remaining in the insert sleeve between the electrodes after the supply of water to the heater has been cut off. This is necessary in order to prevent the dangerous formation of steam and the like, and also in order to obtain an immediate interruption of the electric current when the water supply is cut off. In order to avoid sudden heavy demands on both the electricity and water supplies, the plug $d$ and plug housing $c$ are specially constructed. The passage $q$ is not, as usual, made circular, but is given an elongated, almost rectangular cross-section. The plug is provided with a triangular passage or opening $y$ so that when the plug valve is opened, firstly, the tip of the triangular passage or opening $y$ is rotated until it coincides with the comparatively narrow passage in the housing. In this way, only a small passage for the entry of water is opened. Now, the more the plug is turned into the open position, the more the cross-section of the passage $y$ coincides with the cross-section of the passage $q$ in the housing, until complete coincidence occurs, when there is no restriction on the entry of water into the heater. The adjustment of the electrode spacings, i. e., of the spacings between the conically tapered recess in the electrode body $g$ and the individual elements of the counter-electrode assembly $h$, is necessary in order to adapt the apparatus to the degrees of hardness of the waters of different localities, which vary locally at any time and which govern the necessary electrical input to the apparatus. The electrode connection member $i$ has a special function in this adjustment, viz., that of keeping the displaceable electrode body $g$ permanently in conducting connection with the insulatedly disposed neutral lead in the electrode holder.

As shown in the drawings, the electrodes are completely electrically insulated from each other, and are also completely electrically insulated from the casing. The heater thus complies with all requirements made for reasons of safety.

I claim:

1. An electrode flow heater for heating water comprising in combination an outer casing, a cover for closing the top of said outer casing, a sleeve of pressed insulating material disposed within said outer casing, a carbon electrode body concentrically arranged within said insulating sleeve, said electrode body having three equiangularly spaced conically tapering recesses formed therein, said recesses being disposed on a circle, a supporting member of insulating material concentrically disposed near the top of said casing, three equiangularly spaced conically tapering carbon electrodes depending from said supporting member so as to form a counter-electrode assembly therewith, so that when said counter-electrode assembly is inserted in the casing said three tapering electrodes are received one in each of the corresponding recesses in said electrode body in such a manner that a small space remains between the wall of each recess and the tapering electrode inserted therein, a plug valve disposed at the base of said outer casing and adapted, when operated, to admit water into said casing, which water flows through said spaces so as to be heated on passage of an electric current between each of said tapering electrodes and said electrode body, and means for varying the spacing between the wall of each recess and the tapering electrode inserted therein in order in part to vary the resistance presented by the water flowing through said space, said plug valve being provided with a discharge means which, when said valve is operated to interrupt the inflow of water into the casing, permits rapid drainage of any water remaining in said spaces, thereby preventing dangerous formation of steam.

2. An electrode flow heater as set forth in claim 1 in which said plug valve comprises an elongated plug member of tapering shape, a housing enclosing said plug member and fixedly connected to the heater outer casing so as to permit communication of said valve with the interior of said casing, and a hand lever situated at the thicker end of said plug member and disposed externally of said housing, said hand lever allowing rotation of said plug member within said housing, said plug member being provided with a water discharge bore which, when said hand lever is rotated to rotate said plug member, is adapted to coincide with a corresponding discharge aperture provided in said housing.

3. An electrode flow heater as set forth in claim 2 in which the housing of the plug valve has formed therein a passage communicating with the heater casing, and said plug member is provided with a further bore of generally triangular cross-section, said triangular bore being adapted, when the hand lever is rotated to allow the plug valve to admit water into the casing, to register gradually with said passage, so that first the apex and subsequently the base of said triangular bore come into coincidence with said passage, allowing only an initially small but subsequently increasing volume of water to enter said casing so as to prevent sudden and heavy demands on the water and electricity supplies.

4. An electrode flow heater as set forth in claim 3 including an electrode connecting member centrally disposed within the upper portion of the electrode body, a setting screw centrally disposed so as to project from the lower end of said electrode body, and a threaded member centrally disposed within said electrode body between said connecting member and said setting screw, said electrode body being displaceably arranged within the insulating sleeve, displacement being effected by adjustment of said setting screw.

5. An electrode flow heater as set forth in claim 4 including contact bushes mounted in the supporting member for the conical electrodes, and a cable duct provided in the cover closing the top of the outer casing, said contact bushes providing means for electrical connection to said conical electrodes and the electrode connecting member.

6. An electrode flow heater as set forth in claim 5 in which the water discharge bore and discharge aperture in the plug valve provide access for adjustment of the setting screw.

7. An electric flow heater for heating water comprising in combination an outer casing, a plurality of carbon electrodes of conical shape disposed within and insulated from said outer casing, means for admitting water into said casing so as to cause said water to flow between said electrodes and to be heated due to electrolytic action on passage of an electric current between said electrodes, the said electrodes being connected to a three-phase electricity supply, and a neutral electrode being centrally disposed, the said first-mentioned carbon electrodes being arranged therearound on a circle of which said neutral electrode is the center and the said neutral electrode surrounding in the form of a ring the said first-mentioned carbon electrodes.

8. An electric flow heater for heating water comprising in combination an outer casing, a plurality of carbon electrodes of conical shape disposed within and insulated from said outer casing, means for admitting water into said casing so as to cause said water to flow between said electrodes and to be heated due to electrolytic action on passage of an electric current between said electrodes, the said electrodes being connected to a three-phase electricity supply in star connection, and a neutral electrode being centrally disposed, the said first-mentioned carbon electrodes being arranged therearound on a circle of which said neutral electrode is the center and the said neutral electrode surrounding in the form of a ring the said first-mentioned carbon electrodes.

ALFRED BERND.

REFERENCES CITED

The following references are of record in the file of this patent:

UNITED STATES PATENTS

| Number | Name | Date |
| --- | --- | --- |
| 727,361 | Hill | May 5, 1903 |
| 1,239,325 | Webster | Sept. 4, 1917 |
| 1,683,050 | Penzold | Sept. 4, 1928 |
| 2,032,210 | Holt | Feb. 25, 1936 |
| 2,050,607 | Hallman | Aug. 11, 1936 |
| 2,185,786 | Eaton | Jan. 2, 1940 |
| 2,403,334 | Blanchard | July 2, 1946 |